United States Patent
Stephenson

(10) Patent No.: US 9,274,329 B2
(45) Date of Patent: Mar. 1, 2016

(54) SHUTTER WITH BLADE DAMPING

(71) Applicant: Melles Griot, Rochester, NY (US)

(72) Inventor: Stanley W Stephenson, Spencerport, NY (US)

(73) Assignee: Melles-Griot, Rochester, NY (US)

(*) Notice: Subject to any disclaimer, the term of this patent is extended or adjusted under 35 U.S.C. 154(b) by 379 days.

(21) Appl. No.: 13/858,265

(22) Filed: Apr. 8, 2013

(65) Prior Publication Data

US 2014/0300944 A1 Oct. 9, 2014

(51) Int. Cl.
- G02B 26/02 (2006.01)
- G02B 26/00 (2006.01)
- G02B 5/00 (2006.01)
- G02B 26/04 (2006.01)

(52) U.S. Cl.
CPC ........... *G02B 26/00* (2013.01); *G02B 5/005* (2013.01); *G02B 26/04* (2013.01)

(58) Field of Classification Search
CPC ....... G02B 1/00; G02B 2207/00; G02B 5/005
USPC ................................. 359/230, 234
See application file for complete search history.

(56) References Cited

U.S. PATENT DOCUMENTS

| | | | |
|---|---|---|---|
| 2,486,169 A | 10/1949 | Kaplowitz | |
| 3,604,330 A | 9/1971 | Fahlenberg et al. | |
| 4,312,583 A | 1/1982 | Ohniwa et al. | |
| 4,868,695 A | 9/1989 | Quatro et al. | |
| 5,150,149 A * | 9/1992 | Alligood | G03B 7/087 396/242 |
| 5,155,522 A | 10/1992 | Castor et al. | |
| 5,159,382 A | 10/1992 | Lee et al. | |
| 5,173,728 A | 12/1992 | Sangregory et al. | |
| 5,497,093 A | 3/1996 | Sundeen et al. | |
| 5,502,524 A | 3/1996 | Bovenzi et al. | |
| 5,883,557 A | 3/1999 | Pawlak et al. | |
| 6,123,468 A | 9/2000 | Furlani et al. | |
| 6,530,703 B2 | 3/2003 | Nakano et al. | |
| 6,652,165 B1 | 11/2003 | Pasquarella et al. | |
| 7,701,691 B2 | 4/2010 | Brundisini et al. | |
| 7,845,865 B2 | 12/2010 | Viglione et al. | |
| 2011/0116150 A1 * | 5/2011 | DeWitt | G02B 5/005 359/230 |

OTHER PUBLICATIONS

CVI Melles Griot Optical Systems publication, "Rotor Drive Shutters", pp. 1-5.

* cited by examiner

*Primary Examiner* — Euncha Cherry
(74) *Attorney, Agent, or Firm* — Louis S. Horvath

(57) ABSTRACT

An optical shutter apparatus has at least one shutter blade that is movable between a first position blocking at least a portion of an aperture and a second position spaced apart from the first position. A linkage member is coupled to the at least one shutter blade and has a magnetic material. An actuator is coupled to the linkage member and is energizable to translate the at least one shutter blade between the first and second positions. An intermediate plate has a friction surface of a non-magnetic material. A magnet positioned away from the friction surface of the intermediate plate is disposed to urge the linkage member against the friction surface of the intermediate plate.

19 Claims, 12 Drawing Sheets

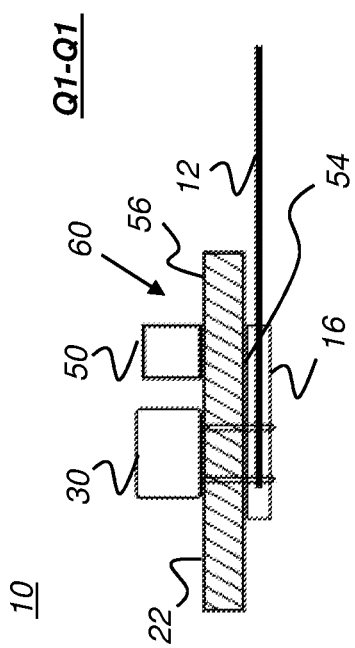

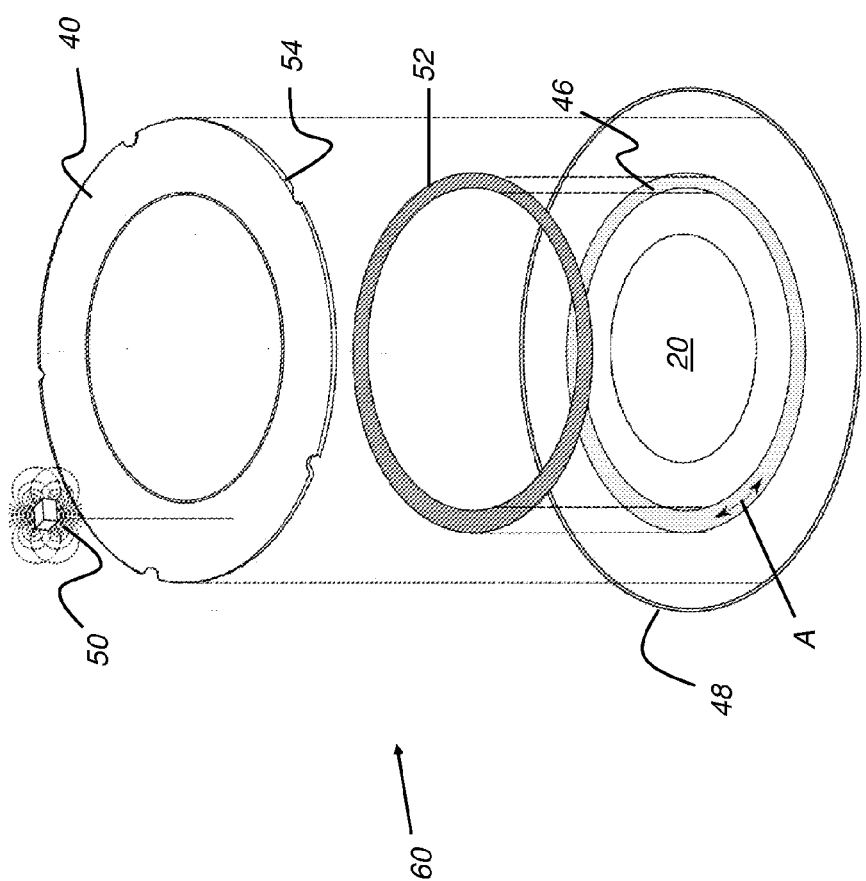

SHUTTER WITH BLADE DAMPING

FIELD OF THE INVENTION

The present invention relates generally to optical shutter apparatus and more particularly relates to optical shutter apparatus having a damping mechanism.

BACKGROUND OF THE INVENTION

Optical shutters are typically designed to operate at high speeds, switching between fully open and fully closed positions at rates that can be as high as several times per second for some types of optical equipment. To provide this type of highly repetitive operation, optical shutter designs are generally lightweight and are often mechanically complex.

One characteristic problem of high speed shutter systems is aptly termed "bounce", an undesirable shutter rebound behavior that tends to extend the effective opening and closing transition times of the shutter. To correct this problem in operation at high speeds, the shutter apparatus typically requires some type of damping mechanism. Effective damping helps to improve performance and to eliminate perceptible bounce or related transient effects. In addition, by softly slowing the movement of the shutter components near the end of their movement path and without damage, damping helps to prolong the effective lifetime of a shutter system, reducing the effect of repetitive impact and consequent wear on the shutter blades and drive components. Damping mechanisms can be used for shutter systems with a single shutter blade or for multi-shutter systems having any number of shutter blades.

Some types of optical shutter have multiple shutter blades that are pivotally mounted about an aperture. In rotary shutters of this type, each blade pivots inwards to block its portion of the aperture, and pivots outwards to open the aperture. To synchronize operation of the plurality of blades, the drive mechanics for each blade are coupled to a rotatable drive ring that orbits the aperture. Rotation of this rotatable drive ring over a small arc in one direction synchronously causes the blades to swing in unison to an open position, opening the aperture. Rotation in the opposite direction causes the blades to swing together to a closed position over the aperture. Conventional shutter solutions use a solenoid to drive the rotatable drive ring to the first and second positions that open or close the shutter. It has been found, however, that high force transmission from a single solenoid can cause high levels of wear on the ring and associated linkage components.

A number of damping solutions have been developed and used for rotatable ring and various other types of shutter. One type of conventional solution uses bumpers of polyurethane or other plastic material, implemented as part of a complex arrangement of springs and resilient members for damping the rotatable drive ring. Other shutter designs have used various types of resilient materials arranged to directly absorb the impact of shutter blades or of the drive linkages themselves.

There are a number of problems with conventional damping solutions, particularly for optical shutters that use a rotatable drive ring for blade synchronization. Bumper materials age over time and can be reshaped or experience uneven wear due to continuing, repetitive impact. After repeated use, some unwanted sticking can occur at the bumper interface. Springs and other components under tension exhibit wear and their coercive properties can change with repeated use. Complex solutions that counter these problems can be costly to design and implement and durability can be compromised.

Thus, it can be seen that there is a need for a damping arrangement that is straightforward to implement, low-cost, high in performance, and particularly well suited for use with optical shutters that use a rotatable drive ring for multiple blade synchronization.

SUMMARY OF THE INVENTION

It is an object of the present invention to advance the art of optical shutter design. Embodiments of the present invention provide shutter damping solutions for single blade shutters as well as for optical shutters that have multiple blades disposed about a rotatable drive ring. Advantageously, embodiments of the present invention are straightforward to implement and add only a small number of components to an existing multi-blade shutter design.

According to one aspect of the present invention, there is provided an optical shutter apparatus comprising:
  at least one shutter blade that is movable between a first position, blocking at least a portion of an aperture and a second position spaced apart from the first position;
  a linkage member that is coupled to the at least one shutter blade and that comprises a magnetic material;
  an actuator that is coupled to the linkage member and is energizable to translate the at least one shutter blade between the first and second positions; an intermediate plate having a friction surface that comprises a non-magnetic material;
  and
  a magnet positioned away from the friction surface of the intermediate plate and disposed to urge the linkage member against the friction surface of the intermediate plate.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 2C is a cross-section view of the optical shutter apparatus of FIG. 2A, showing components for shutter actuation and damping.

FIG. 8 is an exploded view in perspective that shows components of a damping apparatus for an optical shutter apparatus having multiple shutter blades.

DETAILED DESCRIPTION OF THE INVENTION

Figure 1A:
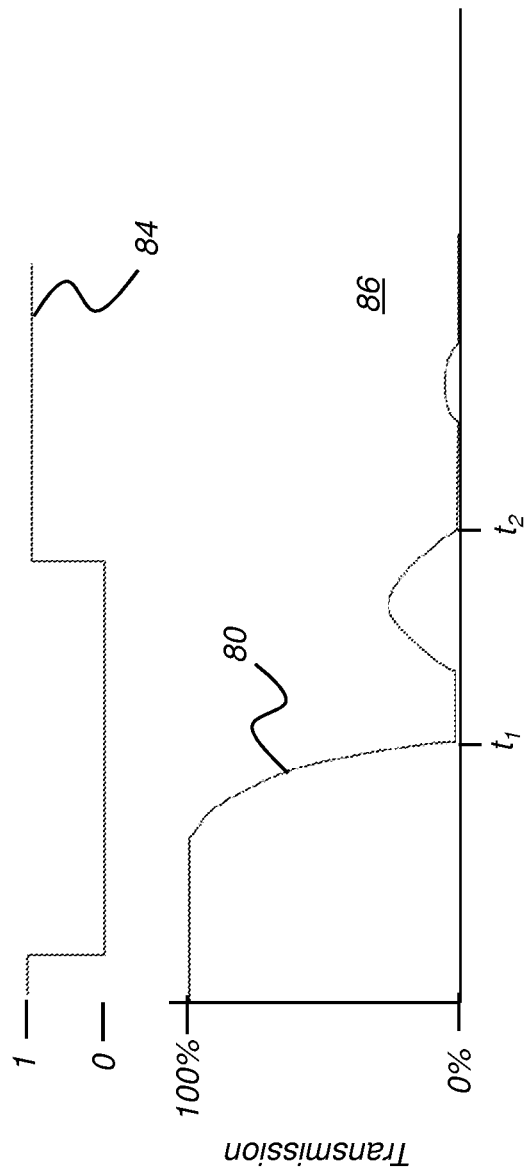
FIG. 1A is a graph that shows the timing and effects of shutter bounce.

Figures provided herein are given in order to illustrate principles of operation and component relationships along their respective optical paths according to the present invention and are not drawn with intent to show actual size or scale.

Some exaggeration may be necessary in order to emphasize basic structural relationships or principles of operation. Some conventional components that would be needed for implementation of the described embodiments, such as support components used for providing power, for packaging, and for mounting, for example, are not shown in the drawings in order to simplify description of the invention. In the drawings and text that follow, like components are designated with like reference numerals, and similar descriptions concerning components and arrangement or interaction of components already described are omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and do not describe any necessary orientation of the assembly in an optical apparatus.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

Non-magnetic materials are materials that are negligibly affected by magnetic fields and that exhibit no perceptible magnetic attraction and are thus not pulled toward a magnet. In general, non-magnetic materials have a low relative magnetic permeability, typically not exceeding 1.0 at room temperature. Some exemplary non-magnetic materials include copper, aluminum, standard stainless steel, and most metals and alloys; sapphire; various ceramics; wood and paper composite materials; glass; water; plastics and other polymers; fiberglass; and various composite materials such as phenolic materials. Magnetic materials have higher relative permeability and are considered to be "magnetically responsive", exhibiting magnetic attraction that can be readily perceived without requiring instrumentation; this includes ferromagnetic and various compounds of rare earth materials, for example.

For a better understanding of embodiments of the present invention, it is instructive to consider shutter bounce and how this problem is addressed. FIG. 1A shows a timing diagram 86 for shutter activity without bounce compensation. A curve 80 shows relative light transmission for a shutter during a transition from an open position, with 100% transmission, to a closed position, blocking light to allow 0% transmission. A curve 84 shows timing of a control signal to a shutter actuator for closing the shutter. Shutter closing is initiated by the 1-to-0 transition of the control signal. The shutter closes at time $t_1$. However, due to bounce, there can be some further amount of light transmission after the shutter initially closes, causing some unwanted light transmission between times $t_1$ and $t_2$. Additional bounce effect can even occur after time $t_2$ as shown.

Figure 1B:
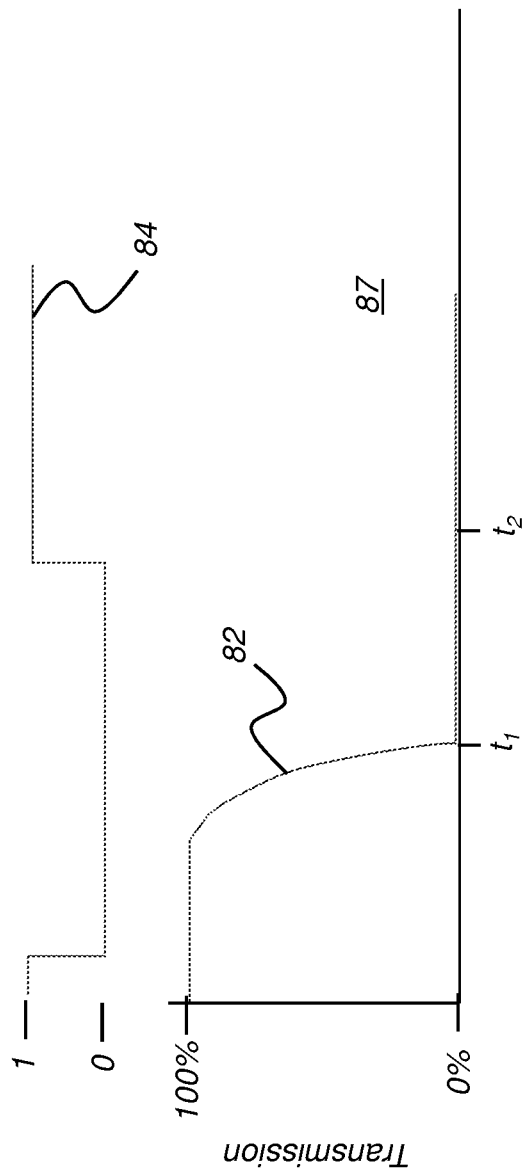
FIG. 1B is a graph that shows how bounce is reduced or eliminated using the damping approach of the present invention.

FIG. 1B shows a timing diagram 87 with bounce compensation using an embodiment of the present invention. In contrast to diagram 86 in FIG. 1A, there is no perceptible bounce after the shutter has closed at time $t_1$.

Figure 2B:
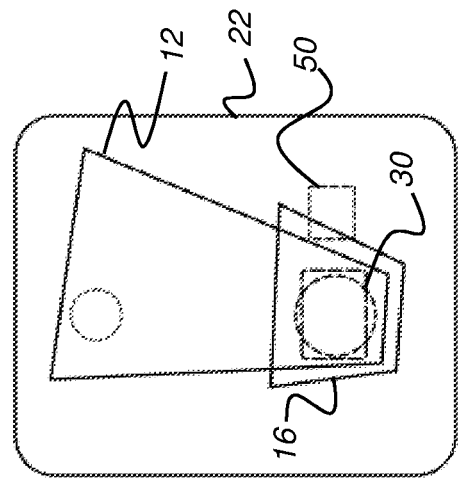
FIG. 2B is a shutter-side view of the optical shutter apparatus of FIG. 2A, with the shutter blade in the closed position.

Embodiments of the present invention provide an optical shutter apparatus with a damping mechanism that advantageously reduces or eliminates bounce without introducing undue wear or mechanical stresses to shutter components. Referring to the shutter-side views of FIGS. 2A and 2B, there is shown an optical shutter apparatus 10 with a shutter blade 12 in open and closed position over an aperture 20, respectively. FIG. 2C shows a cross-sectional side view of optical shutter apparatus 10. A linkage member 16, formed from a magnetic material, is coupled to shutter blade 12 for transferring motion from an actuator 30 that is also coupled to linkage member 16 and that translates shutter blade 12 between its open and closed positions, the open and closed positions spaced apart from each other, wherein shutter blade 12 blocks at least a portion of the aperture in its closed position. Interposed as a separator between linkage member 16 and a magnet 50, there is an intermediate plate 22 having a top surface 56 and, on the opposite side, a friction surface 54 that faces linkage member 16, wherein at least the friction surface 54 is formed from a non-magnetic material. Linkage member 16, friction surface 54, and magnet 50 cooperate to provide a damping apparatus 60 for optical shutter apparatus 10. In operation, magnet 50 urges linkage member 16 against intermediate plate 22 (upward in the view of FIG. 2C), slightly compressing friction surface 54. In the sliding motion of shutter blade 12 actuation, there is slight friction between linkage member 16 and surface 54, sufficient for damping shutter blade 12 movement at its terminating open or closed position.

Figure 2A:
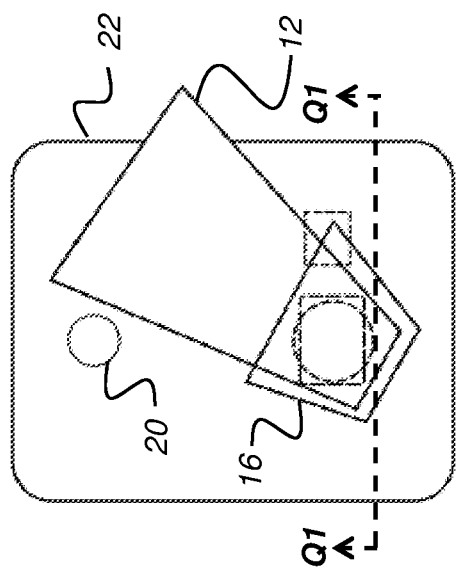
FIG. 2A is a shutter-side view of an optical shutter apparatus according to an embodiment of the present invention, with a single shutter blade in the open position.

The relative amount of friction generated along friction surface 54 can be readily regulated by controlling a number of factors, such as the relative strength of magnet 50, thickness and composition of intermediate plate 22 and its friction surface 54, and the material composition and mechanical arrangement of linkage member 16, for example. Magnet 50, positioned away from friction surface 54, such as by mounting on top surface 56 of intermediate plate 22, can be a permanent magnet or electromagnet. Where an electromagnet is used, there is opportunity to exercise some measure of control over the magnetic field strength that is exerted over the movement cycle, increasing or decreasing the field strength as needed. Intermediate plate 22 can be any of a number of types of non-magnetic materials, including various types of metals or plastics. Consistent with an embodiment of the present invention, intermediate plate 22 is formed from phenolic materials such as those used for electronic circuit boards. When phenolic circuit board material or other phenolic board is used, friction surface 54 is simply the back surface of the phenolic board; no special coating would be required. Thermal properties of phenolic material are favorable for dissipating any generated heat from friction. The phenolic material does not have a tendency to fracture, to flake, or to generate powdery residue. Alternately, a coating can be applied to provide friction surface 54 with suitable qualities for acting as part of damping apparatus 60. Friction surface 54 extends over at least a portion of the corresponding contact area of linkage member 16. Linkage member 16 can be an integral part of the shutter blade 12 itself, formed from the same material used for shutter blade 12. In single shutter blade 12 applications, linkage member 16 can envelop one edge of shutter blade 12 or fasten to some portion of shutter blade 12, as shown in FIGS. 2A-2C.

Figure 3A:
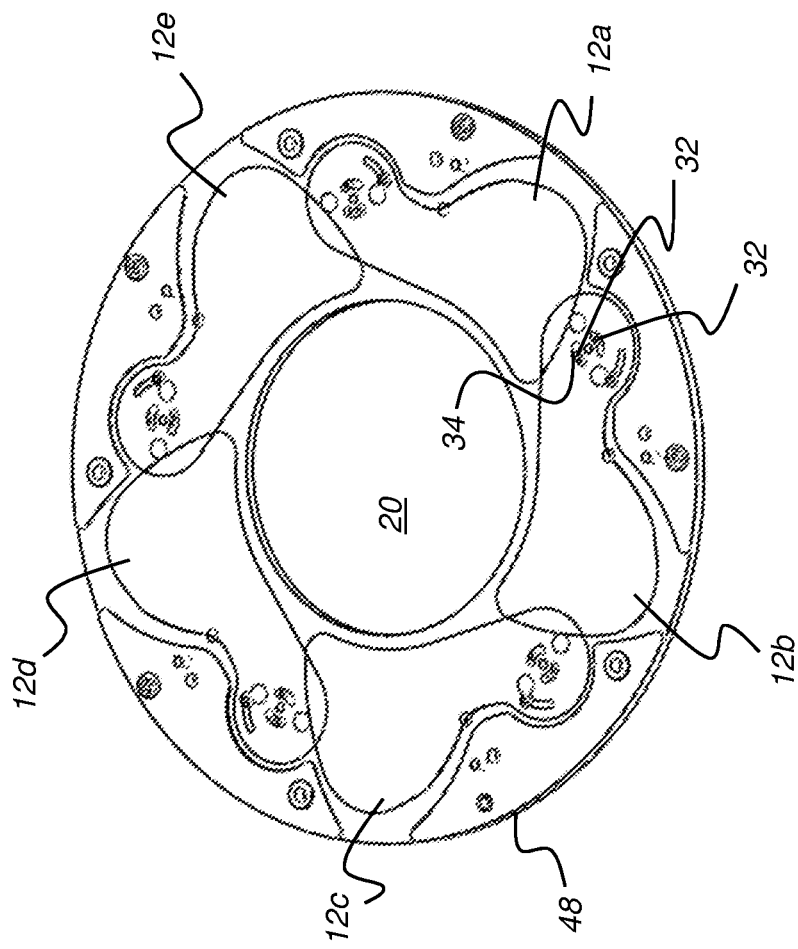
FIG. 3A is a perspective view of the shutter arrangement in an optical shutter apparatus having multiple blades, shutter side up.
Figure 3B:
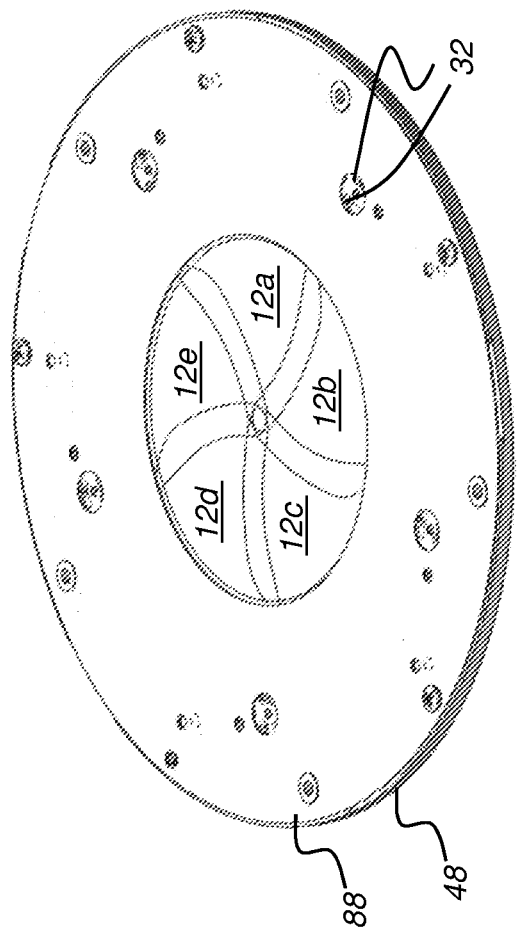
FIG. 3B is a perspective view of the shutter arrangement of the optical shutter apparatus of FIG. 3A with shutters in the closed position.

While embodiments of the present invention can be used to provide damping for single-shutter devices, this same approach can be particularly useful when applied to multi-blade shutter mechanisms for which linkage considerations and actuator configurations can be more complex. FIG. 3A is a perspective view of an optical shutter arrangement in an optical shutter apparatus 10 having multiple blades 12a, 12b, 12c, 12d, and 12e, shown shutter side up. Subsequent description employs this illustrative embodiment with five shutter blades 12a through 12e around a shutter ring provided by a backer plate 48; it must be emphasized, however, that embodiments of the present invention can have fewer than or more than five shutter blades 12a-12e, collectively termed shutter blades 12. In FIG. 3A, shutter blades 12a-12e are in the open position, allowing light through aperture 20. FIG. 3B shows shutter blades 12a-12e in the closed position, with a protective plate 88 shown in position over the shutter blade mechanism.

Figure 3C:
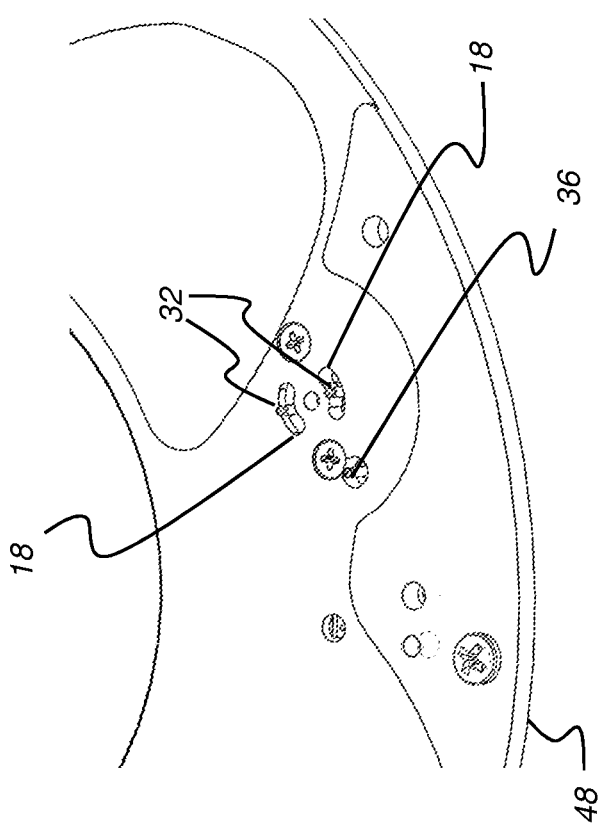
FIG. 3C is a perspective view showing actuator pins extending through arcuate slots in a backer plate for connection to a single shutter blade.

Backer plate 48 provides a supporting shutter ring for shutter blades 12 and helps to provide a platform that retains and allows limited movement of linkage components. FIG. 3A shows the shutter side of backer plate 48, with shutters 12 in position. As shown more clearly in the enlarged close-up view of backer plate 48 in FIG. 3C, with shutter blade 12 removed for better visibility of underlying structures, a pair of actuator pins 32 extend through corresponding arcuate slots 18, providing each shutter blade 12 with similar linkage for opening and closing over aperture 20. Each actuator pin 32 is movable over an arc of a few degrees to pivot the shutter blade 12 to its corresponding open or closed position. A stationary stop pin 36 is also provided for each shutter 12. Stop pin 36 defines the extent of travel of the shutter blade 12 over its arc of movement.

Figure 4:
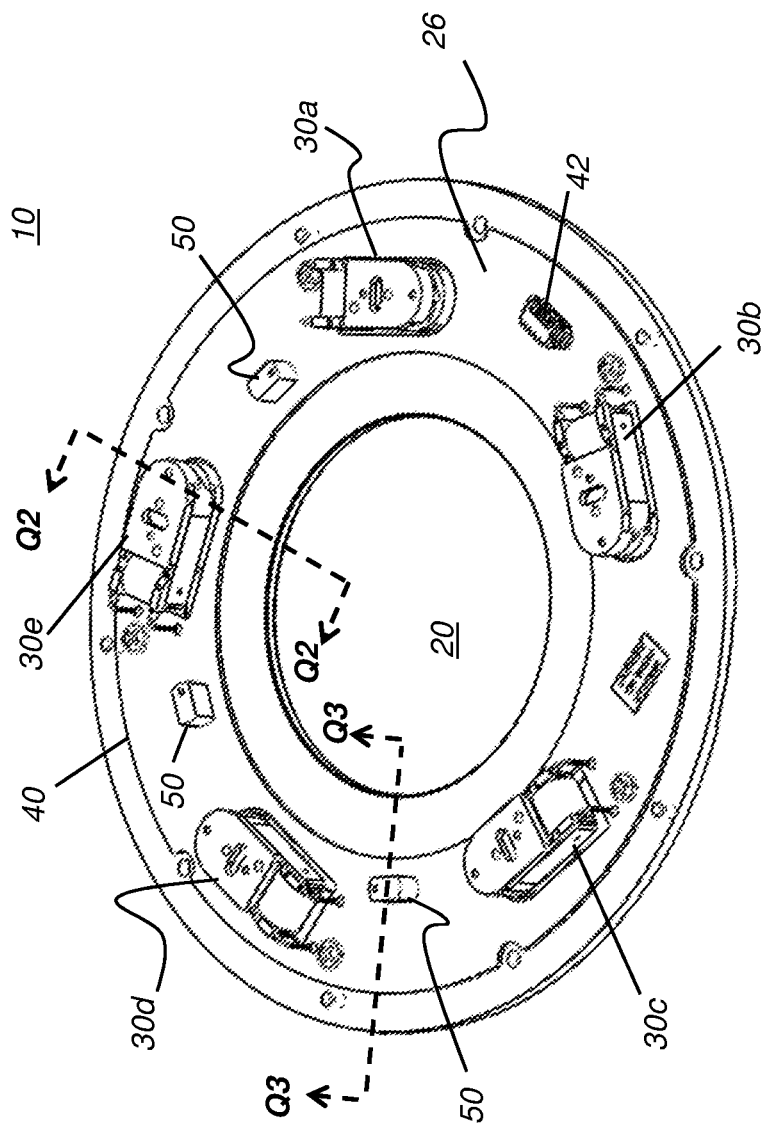
FIG. 4 is a perspective view that shows an assembled optical shutter apparatus according to an embodiment of the present invention, with circuit board side up.

FIG. 4 is a perspective view that shows optical shutter apparatus 10 with a circuit board 40, a component surface 26 side up. Seated on circuit board 40, there is a corresponding actuator 30a, 30b, 30c, 30d, and 30e for each shutter blade 12a, 12b, 12c, 12d, and 12e (FIG. 3A). Actuators 30a, 30b, 30c, 30d, and 30e are collectively termed actuator(s) 30 in subsequent description. According to an embodiment of the present invention, actuators 30 are bistable rotary actuators, with each actuator 30 separately energizable to move its corresponding shutter blade 12. A linkage member in the form of a drive ring, not visible in the assembled view of FIG. 4 but shown in more detail subsequently, synchronizes the action of multiple shutter blades 12. A signal connector 42 on circuit board 40 provides the actuation signals to each actuator 30, so that actuators 30 are energized in unison to control the open or closed condition of aperture 20. FIG. 4 also shows the position of three magnets 50 that act as part of a damping apparatus to compensate shutter bounce in embodiments of the present invention, as described in more detail subsequently. Circuit board 40 is formed from phenolic or other type of non-magnetic material.

Figure 5:
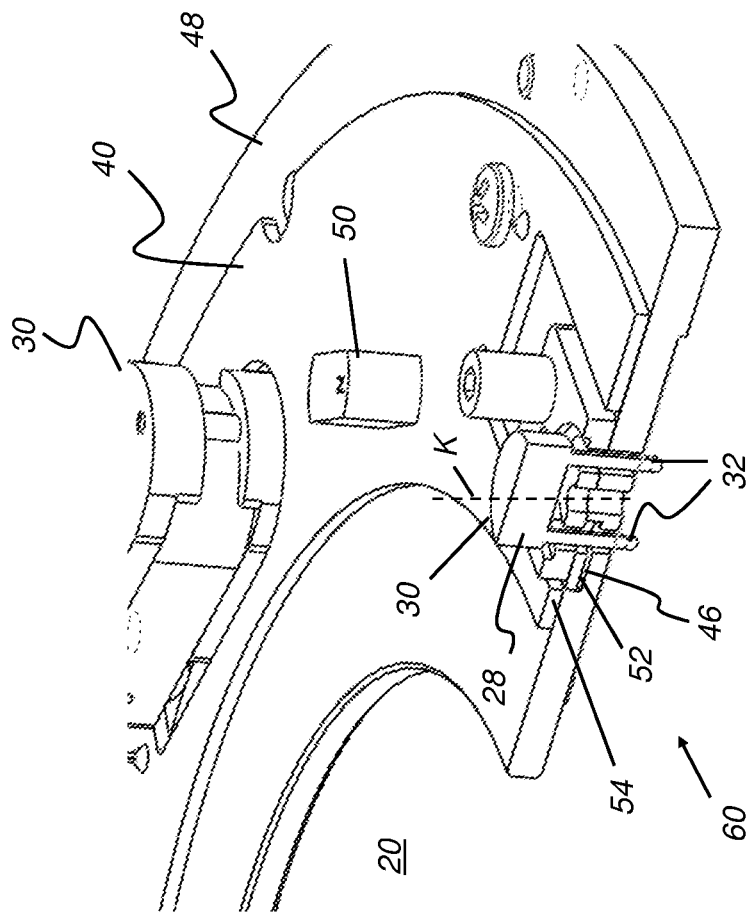
FIG. 5 is a cross section view of a portion of the multi-shutter blade optical shutter apparatus of FIGS. 3A and 3B, with the cross section extending through an actuator.

FIG. 5 is a cross section view, taken at reference Q2-Q2 in FIG. 4, of a portion of the multi-shutter optical shutter apparatus 10 with the cross section extending through a bistable actuator 30. Pins 32 extend from actuator 30 to engage the corresponding slot 34 of shutter blade 12, as shown in FIGS. 3A and 3B. Actuator 30 receives power from circuit traces (not shown) that extend along circuit board 40 but is not mounted onto circuit board 40 in the embodiment shown in FIGS. 4, 5, 6, and 7.

Figure 6:
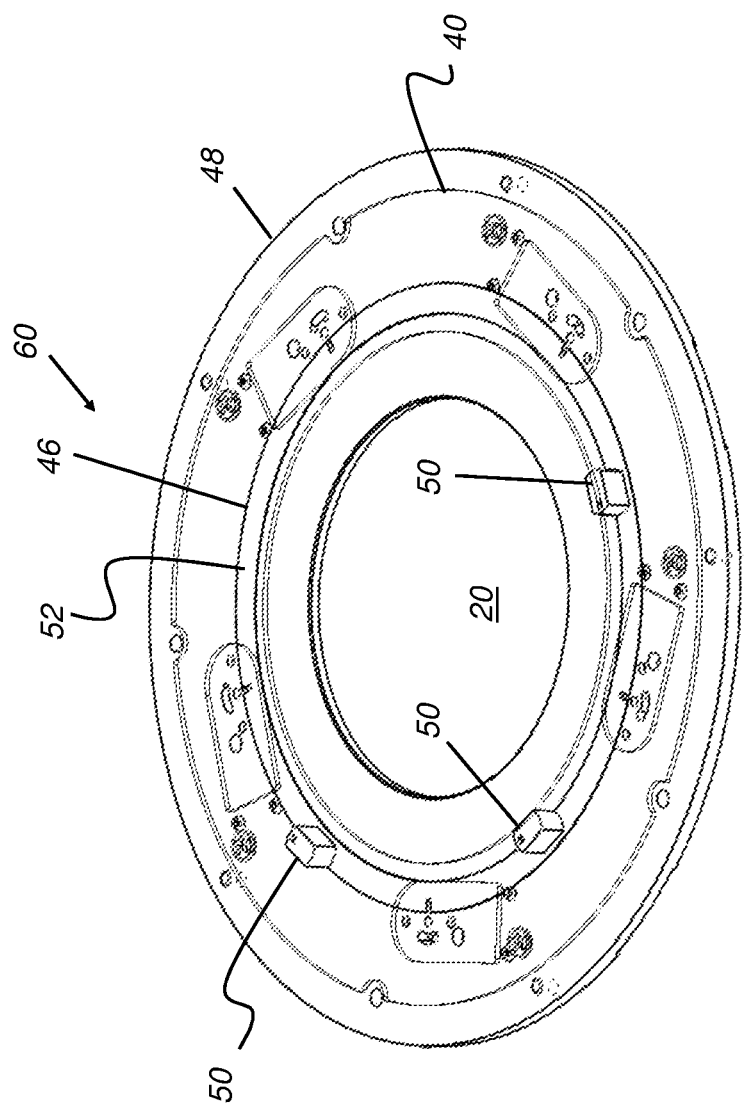
FIG. 6 is a perspective view showing the optical shutter apparatus of FIGS. 3A and 3B, with a number of circuit board components removed to allow visibility of damping apparatus components.
Figure 7:
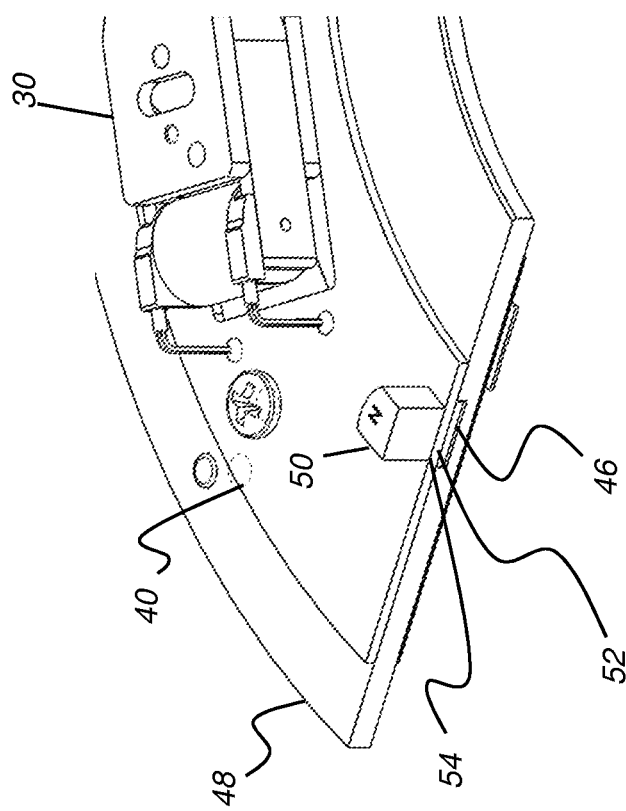
FIG. 7 is a cross section view of a portion of the optical shutter apparatus of FIGS. 3A and 3B, with the cross section extending through a magnet.

FIGS. 5, 6, and 7 show the internal mechanism for opening and closing shutter blades 12 in unison and also show features of damping apparatus 60 that provides the damping action that reduces perceptible bounce following shutter transitions. With reference to FIG. 5, a portion of a linkage member for multi-shutter blade devices, drive ring 52, is shown in position within a recess 46 formed in backer plate 48. Drive ring 52 provides mechanical linkage between one pin 32 of each actuator 30 in optical shutter apparatus 10. Drive ring 52 provides mechanical linkage to the innermost pin 32 of each actuator 30 in the embodiment shown, that is, to the actuator pin 32 that is positioned closest to aperture 20. Drive ring 52 is synchronously driven by each actuator 30 so that all of the shutter blades 12 pivot in unison into or away from aperture 20. Each actuator 30 has a rotating element 28, sectioned in FIG. 5, that rotates about its respective axis K. As is shown in FIGS. 5, 6, and 7, drive ring 52 is circularly shaped or ring shaped and is seated for slidable movement along an arc within recess 46 formed in backer plate 48.

FIG. 6 is a perspective view showing the optical shutter apparatus of FIG. 4, with a number of circuit-surface components, such as actuators 30 and connector 42, removed to allow better visibility of drive ring 52 and other damping apparatus 60 components. Circuit board 40 is shown, with the positions of five actuators 30 shown in outline. Actuators 30 seat on backer plate 48 in the embodiment that is shown (FIG. 5). Circuit board 40 mounts onto backer plate 48. Drive ring 52, in the shape of a flattened ring, encircles aperture 20 and is loosely sandwiched between circuit board 40 and backer plate 48, lying within recess 46.

FIG. 7 is a cross section view of a portion of the optical shutter apparatus of FIG. 4, with the cross section extending through a magnet 50 as indicated by references Q3. Damping apparatus 60 has a number of magnets 50 that are positioned over circular recess 46. For damping, magnets 50 attract drive ring 52 against a back surface, friction surface 54, of circuit board 40. Magnets 50 are selected so that they are of appropriate strength to provide a measure of damping as they urge drive ring 52 against friction surface 54, providing an amount of friction that allows free movement of drive ring 52 but reduces bounce. Magnets 50 can be mounted on circuit board 40 with suitable adhesive.

FIG. 8 is an exploded view in perspective that shows the relative arrangement and alignment of components of damping apparatus 60 for an optical shutter apparatus that has multiple shutter blades. Actuators and shutter blades are not shown in FIG. 8, removed for clarity. Drive ring 52 is movable along an arc A within recess 46, which forms a track for drive ring 52 rotation about aperture 20. Drive ring 52 is sandwiched between backer plate 48 and circuit board 40. Magnet 50, which seats on circuit board 40, urges drive ring 52 upward (in the orientation shown in FIG. 8) against friction surface 54 of circuit board 40.

Employing the basic arrangement described herein, damping apparatus 60 uses magnetic attraction between magnets 50 and drive ring 52 and the inherent friction of the printed circuit board 40 substrate or, more precisely, of its friction surface 54, that is disposed between magnets 50 and drive ring 52 or other type of linkage member, to significantly reduce unwanted movement of the drive linkage and thus reduce or eliminate unwanted bounce of shutter blades 12 at the end of the movement cycle.

The circuit board 40 substrate, a phenolic material, is non-magnetic and has been found to exhibit particularly desirable properties for acting as a type of brake, accommodating moving contact of drive ring 52 against its back surface, friction surface 54, without undue wear, flaking, or material degradation. According to an embodiment of the present invention, there are no conductive traces or features on friction surface 54 so that the corresponding surface of linkage ring 52 is in surface contact only against phenolic or other suitable material.

The invention has been described in detail with particular reference to a presently preferred embodiment, but it will be understood that variations and modifications can be effected within the spirit and scope of the invention. For example, a single actuator can be used for actuating multiple shutters, such as using a single solenoid as actuator 30 for the five shutters shown in FIGS. 3A and 3B, for example. Actuators of various types could be used, including bistable rotary actuators and linear actuators, for example. Fewer or more than three magnets 50 could be used, distributed along the path along which drive ring 52 extends. Magnets 50 could be any of a number of types of permanent magnet, formed from iron or compounds including ceramic, or rare earth materials. One or more of magnets 50 could alternately be electromagnets and could be energized to provide variable field strength. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An optical shutter apparatus comprising:
    at least one shutter blade that is movable between a first position, blocking at least a portion of an aperture and a second position spaced apart from the first position;
    a linkage member that is coupled to the at least one shutter blade and that comprises a magnetic material;
    an actuator that is coupled to the linkage member and is energizable to translate the at least one shutter blade between the first and second positions;
    an intermediate plate having a friction surface that comprises a non-magnetic material;
    and
    a magnet positioned away from the friction surface of the intermediate plate and disposed to urge the linkage member against the friction surface of the intermediate plate.

2. The optical shutter apparatus of claim 1 wherein the at least one shutter blade is a first shutter blade and further comprising a second shutter blade, wherein the linkage member is further coupled to the second shutter blade.

3. The optical shutter apparatus of claim 2 wherein the actuator is a first actuator and further comprising a second actuator that is coupled to the linkage member and that is energizable to move the second shutter blade.

4. The optical shutter apparatus of claim 1 wherein the linkage member is an integral part of the shutter blade.

5. The optical shutter apparatus of claim 1 wherein the intermediate plate is a phenolic material.

6. The optical shutter apparatus of claim 1 wherein the intermediate plate is aluminum.

7. The optical shutter apparatus of claim 1 wherein the actuator is taken from the group consisting of a bistable rotary actuator and a linear actuator.

8. The optical shutter apparatus of claim 1 wherein the magnet is an electromagnet.

9. The optical shutter apparatus of claim 1 wherein the linkage member is ring-shaped.

10. An optical shutter apparatus for directing or blocking light through an aperture, comprising:
    a plurality of shutter blades, each pivotable into or out from the aperture;
    a circuit board formed about the aperture and having a first surface that faces the plurality of shutter blades and a second surface that faces one or more corresponding actuators;
    a linkage member formed from a magnetic material and translatable over an arc about the aperture, wherein the linkage member is featured to engage one or more drive members of each of the one or more actuators to synchronize the pivoting of the plurality of shutter blades; and
    a plurality of magnets positioned along the second surface of the circuit board and disposed to urge the linkage member against the first surface of the circuit board.

11. The optical shutter apparatus of claim 10 wherein the linkage member is ring-shaped.

12. The optical shutter apparatus of claim 10 wherein the one or more actuators is a rotary actuator.

13. The optical shutter apparatus of claim 10 wherein the one or more actuators is a solenoid.

14. The optical shutter apparatus of claim 10 wherein the circuit board is mounted on a backer plate and wherein the linkage member is sandwiched between the circuit board and the backer plate.

15. A method for opening and closing an optical aperture, the method comprising:
    coupling at least one shutter blade to a linkage member that is formed from a magnetic material;
    coupling at least one actuator to the linkage member, wherein the at least one actuator is energizable to translate the at least one shutter blade between a first position over at least a portion of the optical aperture and second position spaced apart from the first position; and
    disposing an intermediate plate between the linkage member and a magnet,
    wherein the intermediate plate is formed from a non-magnetic material and
    wherein the magnet urges the linkage member into contact against a friction surface of the intermediate plate.

16. The method of claim 15 wherein the intermediate plate is a phenolic material.

17. The method of claim 15 wherein the linkage member is ring shaped.

18. The method of claim 15 wherein the at least one actuator is a bistable rotary actuator.

19. The method of claim 15 wherein the magnet is fastened to a top surface of the intermediate plate, wherein the top surface is opposite the friction surface of the intermediate plate.

* * * * *